(12) United States Patent
Santos et al.

(10) Patent No.: US 11,034,877 B2
(45) Date of Patent: Jun. 15, 2021

(54) EMULSIFIERS FOR DIRECT EMULSION DRILLING FLUIDS

(71) Applicant: Halliburton Energy Services, Inc., Houston, TX (US)

(72) Inventors: Catherine Martin Santos, Houston, TX (US); Li Guo, Humble, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 16/480,306

(22) PCT Filed: Jul. 22, 2019

(86) PCT No.: PCT/US2019/042853
§ 371 (c)(1),
(2) Date: Jul. 23, 2019

(87) PCT Pub. No.: WO2020/023401
PCT Pub. Date: Jan. 30, 2020

(65) Prior Publication Data
US 2020/0339859 A1      Oct. 29, 2020

Related U.S. Application Data

(60) Provisional application No. 62/703,579, filed on Jul. 26, 2018.

(51) Int. Cl.
*E21B 21/06*   (2006.01)
*C09K 8/28*    (2006.01)

(52) U.S. Cl.
CPC .............. *C09K 8/28* (2013.01); *E21B 21/065* (2013.01); *C09K 2208/18* (2013.01); *C09K 2208/32* (2013.01); *C09K 2208/34* (2013.01)

(58) Field of Classification Search
None
See application file for complete search history.

(56) References Cited

U.S. PATENT DOCUMENTS

| | | | |
|---|---|---|---|
| 4,713,431 A | 12/1987 | Bhattacharyya et al. | |
| 4,863,980 A * | 9/1989 | Cowan | E21B 21/003 |
| | | | 525/54.31 |

(Continued)

FOREIGN PATENT DOCUMENTS

| | | |
|---|---|---|
| CA | 2867496 | 8/2014 |
| WO | 2012085516 | 6/2012 |
| WO | 2013112725 | 8/2013 |

OTHER PUBLICATIONS

International Search Report and Written Opinion for PCT/US2019/042853 dated Oct. 24, 2019.

(Continued)

*Primary Examiner* — Andrew Sue-Ako
(74) *Attorney, Agent, or Firm* — Tenley Krueger; C. Tumey Law Group PLLC

(57) ABSTRACT

A method of drilling in a subterranean formation is disclosed. The method may include providing a direct emulsion drilling fluid comprising an aqueous-based fluid, an oil, and a poly-quaternary ammonium chloride emulsifier; circulating the direct emulsion drilling fluid from the surface, through a wellbore, and back to the surface; and extending the wellbore in the subterranean formation while circulating the direct emulsion drilling fluid.

20 Claims, 1 Drawing Sheet

(56) References Cited

U.S. PATENT DOCUMENTS

| | | | |
|---|---|---|---|
| 7,576,038 B2 | 8/2009 | Smith | |
| 7,939,470 B1 | 5/2011 | Wagle et al. | |
| 2006/0289164 A1* | 12/2006 | Smith | C09K 8/74 |
| | | | 166/295 |
| 2007/0173414 A1* | 7/2007 | Wilson, Jr. | C09K 8/04 |
| | | | 507/240 |
| 2010/0300967 A1 | 12/2010 | Dakin et al. | |
| 2013/0156638 A1* | 6/2013 | Hellberg | C10L 1/221 |
| | | | 422/7 |
| 2014/0175008 A1* | 6/2014 | Mathis | E21B 21/066 |
| | | | 210/602 |
| 2014/0238674 A1* | 8/2014 | Savari | C09K 8/50 |
| | | | 166/281 |
| 2016/0230064 A1 | 12/2016 | Savari et al. | |

OTHER PUBLICATIONS

Chang, E. E., Chiang, P. C., Chao, S. H., & Liang, C. H. (1999). Effects of polydiallyldimethyl ammonium chloride coagulant on formation of chlorinated byproducts in drinking water. Chemosphere, 39(8), 1333-1346.

* cited by examiner

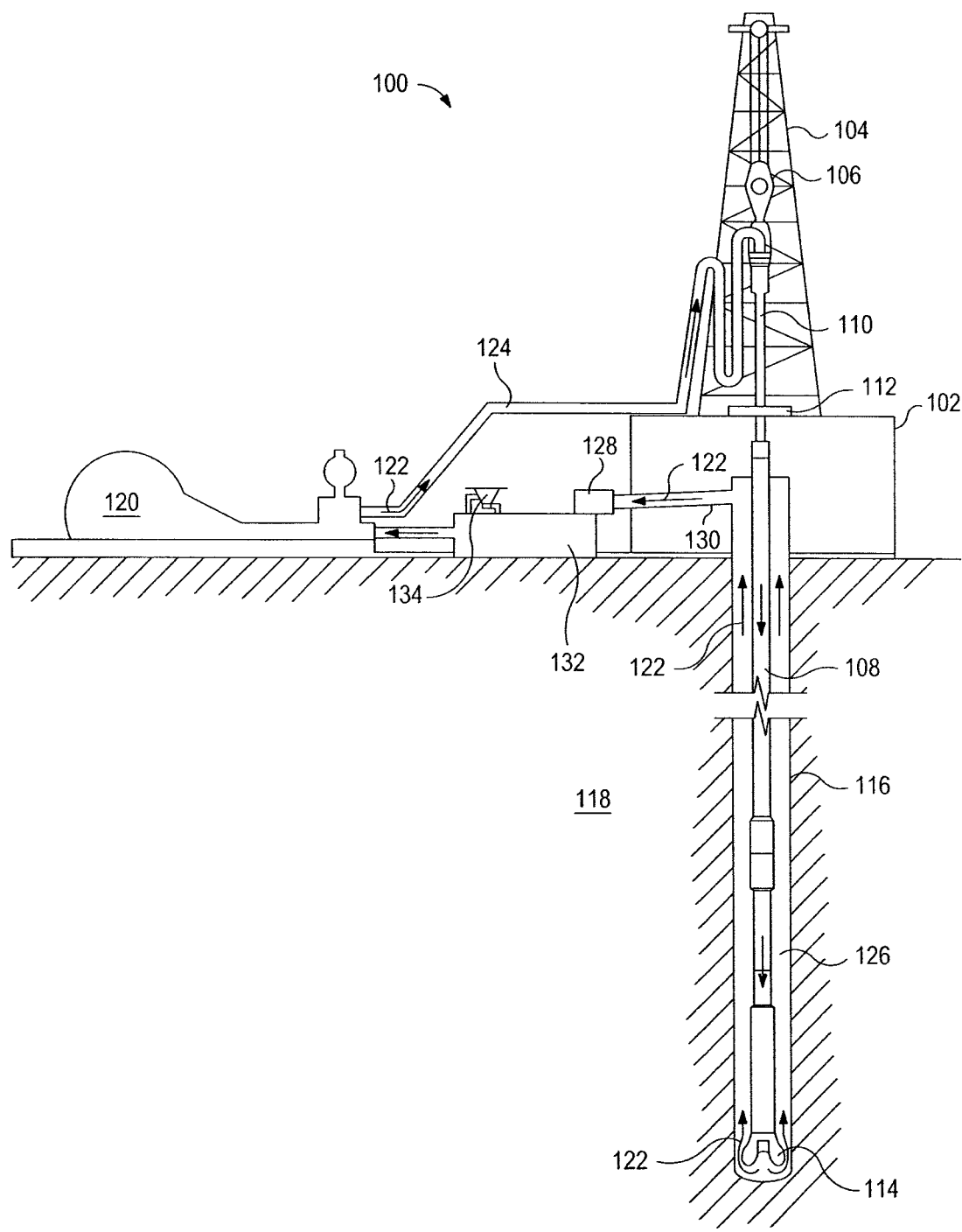

EMULSIFIERS FOR DIRECT EMULSION DRILLING FLUIDS

BACKGROUND

Drilling fluids are the complex fluids used for the drilling of subterranean oil and gas wells. The successful completion of an oil and gas well and production of hydrocarbons from the oil and gas reservoir depends upon, to a considerable extent, the properties of drilling fluids selected. The selection of an appropriate fluid and the maintenance of the properties primarily influence the production rate while drilling. The complex fluids perform several functions simultaneously. For example, drilling fluids clean the well; hold the cuttings in suspension; reduce friction between the drill string and sides of the well; maintain the stability of a wellbore by imposing hydrostatic pressure on the walls thereof; prevent fluid loss to the formation to avoid formation damage and differential pipe sticking by making thin, impermeable filter cakes; cool and lubricate drilling tools; and contribute to the evaluation of the formation by raising the cuttings from the wellbore bottom up to the surface of the well.

Drilling fluid density may be an important factor to monitor during drilling operations, as the hydrostatic pressure exerted by the drilling fluid is directly proportional to the density of the drilling fluid. Hydrostatic pressure may increase with increasing density of the drilling fluid and height of fluid column. Excess hydrostatic pressure above the fracture gradient of the formation may lead to premature fracturing of the formation and resultant formation damage and fluid loss.

To remedy these and other issues, lower density drilling fluids may be required. Oil may be added to a drilling fluid to reduce the density, but these systems may not be stable at static conditions. Furthermore, these systems may become increasingly unstable at high salinity, particularly in certain aqueous-based drilling fluids.

BRIEF DESCRIPTION OF THE DRAWINGS

These drawings illustrate certain aspects of some examples of the present invention and should not be used to limit or define the invention.

The FIGURE is a schematic diagram of an example drilling assembly.

DETAILED DESCRIPTION

Provided are compositions and methods for a direct emulsion drilling fluid. A direct emulsion drilling fluid may also be referred to as an oil-in-water emulsion or an oil-in-aqueous based fluid emulsion, wherein the terms are used interchangeably herein. A characteristic of a direct emulsion drilling fluid may be that the aqueous phase of the emulsion is the external phase while the oil phase is the internal phase. The direct emulsion drilling fluid may be used during a wellbore drilling operation to aid in the creation and extension of a wellbore through a subterranean formation. Generally, it may be desirable to keep the subterranean formation in a water-wet condition where a thin film of water may coat the surface of the subterranean formation matrix. A water-wet condition may allow for more efficient hydrocarbon transport than where the subterranean formation is in an oil-wet condition. A direct emulsion drilling fluid may provide certain benefits to drilling in formations where a relatively lower density drilling fluid is desired. A direct emulsion drilling fluid may be mixed to a variety of densities appropriate for a particular application.

Conversely, an invert emulsion drilling fluid refers to an oil-based mud, wherein the terms may be considered synonymous. Invert emulsion muds may include from 5% to 50% water in the liquid phase. For example, in an invert emulsion, water droplets may be dispersed in a continuous phase of oil. Hence, direct emulsion may refer to an oil-containing drilling fluid or mud, wherein the oil becomes the dispersed phase and water becomes the continuous phase; whereas invert emulsion mud may be defined as oil-based drilling fluids or mud to which water is added, wherein oil becomes the continuous phase.

In some structurally weaker formations such as formations that include a higher salt or other dissolvable species content, unconsolidated formations, and formations with a relatively low fracture gradient, conventional drilling fluids may damage the wellbore and subterranean formation. Damage to the formation may include any range of damage from small amounts of washout or removal of wellbore surface material beyond the size of the drill bit up to and including wellbore collapse. A particular challenge in extending a wellbore through a subterranean formation including a relatively high amount of water-soluble species is that a water-based drilling fluid may solvate the soluble species and remove them from the formation and wellbore surface. The water-soluble species may then be moved from the wellbore as the drilling fluid flows back up the annulus. In applications such as drilling though a salt dome, a saturated brine-based drilling fluid may be used to minimize the amount of salt removed. In some salt dome drilling applications, the only safe way to drill is with a saturated brine fluid.

In general, salt containing aqueous fluids such as saturated and unsaturated brines may have a relatively higher density than pure water. Drilling through a subterranean formation with a relatively denser saturated brine containing drilling fluid may present challenges such as increased hydrostatic pressure and increased equivalent circulating. A relatively higher density drilling fluid may prematurely fracture the subterranean formation due to the higher hydrostatic pressure associated with denser fluids. Additionally, relatively denser fluids may require a higher horsepower to pump than relatively less dense fluids. Additional horsepower may become cost prohibitive at higher volumetric flow rates. In some conventional drilling operations, water or oil may be added to a drilling fluid to decrease the density. In applications where a saturated brine is required, the density typically cannot be decreased with water as the brine would not remain saturated. In such applications, an oil may be used to reduce the density. Such oil and water systems may stratify rapidly, even when an emulsifier is used. Such systems may need to be pumped at high velocities so that turbulent mixing keeps the oil and water emulsified. High velocities again may require even higher horsepower requirements and may lead to a variety of other adverse conditions such as jetting from the drill head which may damage the formation. Additionally, the oil in water emulsion drilling fluids are typically continuously agitated at the surface or phase separation may occur. As such, saturated brine direct emulsion drilling fluids may not be well suited for storing for an extended period and may require additional surface equipment to prepare and use.

The direct emulsion drilling fluid may include an aqueous fluid, such as a brine, an oil and a poly-quaternary ammonium chloride emulsifier. The brine may be from any source provided that it does not contain an excess of compounds that may undesirably affect other components in the direct emulsion drilling fluid. For example, the direct emulsion drilling fluid may include a saturated brine including water and a salt. Seawater or other brines may be suitable for use in some examples. The brines may include monovalent or divalent salts such as, without limitation, at least one of sodium chloride, sodium bromide, potassium bromide, potassium chloride, magnesium chloride, calcium chloride, calcium bromide, potassium formate, cesium formate, lithium chloride, lithium bromide sodium formate, lithium formate, ammonium chloride, organic cation salts such as tetramethyl ammonium chloride, choline chloride, or mixtures thereof among others.

Further, the brine may be present in an amount sufficient to form a pumpable slurry. The salt may be present in the brine in any amount to form a saturated solution or supersaturated solution. For example, the salt may be provided in an amount of about 1% to about 50% by weight of the brine. Alternatively, about 1% to about 5% by weight, about 5% to about 10% by weight, about 10% to about 15% by weight, about 15% to about 20% by weight, about 20% to about 25% by weight, about 25% to about 30% by weight, about 30% to about 35% by weight, about 35% to about 40% by weight, about 40% to about 45% by weight, about 45% to about 50% by weight, or about 10% to about 30% by weight.

The aqueous-based fluid may be present in the direct emulsion drilling fluid at a volume ratio of about 10 vol % aqueous-based fluid to 80 vol % aqueous-based fluid. Alternatively, the aqueous-based fluid may be present in the direct emulsion drilling fluid at a volume ratio of about 10 vol % aqueous-based fluid to about 30 vol % aqueous-based fluid, about 30 vol % aqueous-based fluid to about 40 vol % aqueous-based fluid, about 40 vol % aqueous-based fluid to about 50 vol % aqueous-based fluid, about 50 vol % aqueous-based fluid to about 60 vol % aqueous-based fluid, about 60 vol % aqueous-based fluid to about 70 vol % aqueous-based fluid, or about 70 vol % aqueous-based fluid to about 80 vol % aqueous-based fluid.

The direct emulsion drilling fluid may include, for example, any number or variety of oils. Examples of suitable oils that may be included in the direct emulsion drilling fluid may include, but are not limited to, at least one oil selected from the group consisting of an α-olefin, internal olefin, alkane, aromatic hydrocarbon, cycloalkane, liquefied petroleum gas, kerosene, diesel oil, crude oils, gas oil, fuel oil, paraffin oil, mineral oil, light cycle oil, tall oil, refined oil, low-toxicity mineral oil, olefins, ester, amide, synthetic oil (e.g., polyolefin), polydiorganosiloxane, siloxane, organosiloxane, ether, dialkylcarbonate, vegetable oil, or combinations thereof.

The oil may be present in the direct emulsion drilling fluid at a volume ratio of about 20 vol % oil to 90 vol % oil. Alternatively, the oil may be present in the direct emulsion drilling fluid at a volume ratio of about 20 vol % oil to about 30 vol % oil, about 30 vol % oil to about 40 vol % oil, about 40 vol % oil to about 50 vol % oil, about 50 vol % oil to about 60 vol % oil, about 60 vol % oil to about 70 vol % oil, about 70 vol % oil to about 80 vol % oil, or about 80 vol % oil to about 90 vol % oil. For volumes of oil above 50% the direct emulsion drilling fluid may still be considered a direct emulsion even though the volume of oil may be present in an amount greater than the water because the poly-quaternary ammonium chloride emulsifier allows the water to remain at the continuous phase thereby keeping the direct emulsion drilling fluid water-wetting.

There may be several challenges with using a direct emulsion drilling fluid such as emulsion stability and wettability problems, among others. When the direct emulsion drilling fluid is mixed, the emulsion may become unstable and stratify into layers of aqueous phase and oil phase. At certain ratios of oil and water, the direct emulsion drilling fluids may become oil-wetting instead of water-wetting. However, the addition of a poly-quaternary ammonium chloride emulsifier, wherein the poly-quaternary ammonium chloride emulsifier to the direct emulsion drilling fluid may be used to stabilize a water-in-oil emulsion system. The poly-quaternary ammonium chloride emulsifier may include a polymer formed by repeating quaternary ammonium salt units. A general structure of a monomer of the poly-quaternary ammonium salt is illustrated below:

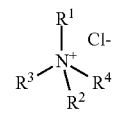

The poly-quaternary ammonium chloride emulsifier may include any number of substituent groups for $R^1$, $R^2$, $R^3$, and $R^4$. $R^1$, $R^2$, $R^3$, and $R^4$ may be a variety of alkyl or aryl groups, or combinations thereof, such as, for example, methyl, ethyl, propyl, hydroxyethyl or hydroxypropyl; or tolyl, xylyl, or naphthyl. For example, $R^1$ may be characterized in that $R^2$, $R^3$ and $R^4$ may be identical when $R^1$ is an ethyl, propyl, hydroxyethyl or hydroxypropyl; or tolyl group, xylyl group, or naphthyl group. In some examples, the poly-quaternary ammonium chloride emulsifier may include, but not limited to, polybenzyldimethylammonium chloride, benzalkonium chloride, benzethonium chloride, methylbenzethonium chloride, cetalkonium chloride, cetylpyridinium chloride, dofanium chloride, didecyldimethylammonium chloride, and combinations thereof. The poly-quaternary ammonium chloride emulsifier may be classified according to molecular weight, such as, for example, low molecular weight, with a total molecular weight of less than about 1000; medium molecular weight, with a total molecular weight of from about 1000 up to about 10,000; a high molecular weight of from about 10,000 up to over one million.

The poly-quaternary ammonium chloride emulsifier may be present in an amount of about 0.10 lb/bbl (pounds per barrel) (0.3 kg/ins) to about 10 lb/bbl (438 kg/m$^3$) in the direct emulsion drilling fluid. Alternatively, the poly-quaternary ammonium chloride emulsifier may be present in an amount of about 0.10 lb/bbl (pounds per barrel) (0.3 kg/m$^3$) to about 0.5 lb/bbl (1.4 kg m$^3$), about 0.5 lb/bbl (1.4 kg/m$^3$) to about 2.5 lb/bbl (7 kg/m$^3$), about 2.5 lb/bbl (7 kg/m$^3$) to about 4 lb/bbl (11 kg m$^3$), or about 4 lb/bbl (11 kg/m$^3$) to about 10 lb/bbl (29 kg/m$^3$).

The direct emulsion drilling fluid may generally have a density suitable for a particular application. By way of example, the direct emulsion drilling fluid may have a density of about 7 pounds per gallon ("lb/gal") (8398 kg/m$^3$) to about 20 lb/gal (2397 kg/m$^3$). Alternatively, the direct emulsion drilling fluid may have a density of about 7 lb/gal (8398 kg/m$^3$) to about 12 lb/gal (1438 kg/m$^3$), about (1438 kg/m$^3$) to about 15 lb/gal (1797 kg/m$^3$), or about 15 lb/gal (1797 kg/m$^3$) to about 20 lb/gal (2397 kg/m$^3$). Embodiments of the direct emulsion drilling fluid may include other means to reduce their densities, such as hollow microspheres, low-density elastic beads, or other density-reducing additives known in the art. In some embodiments, the density may be reduced during production of the direct emulsion drilling fluid prior to placement in a subterranean formation.

The density of a particular direct emulsion drilling fluid may be directly affected by the ratio of oil to aqueous-base fluid, generally referred to herein as oil-to-water or "O/W", in the direct emulsion drilling fluid. The aqueous-base fluid may be present as the continuous phase while the oil may be in the dispersed phase. Any suitable ratio of oil-to-water may be used to form the direct emulsion drilling fluid to achieve any desired density. For example, the O/W ratio may be 90:10 to 20:80. Alternatively, the O/W ratio may be 90:10 to 80:20, 80:20 to 70:30, 70:30 to 60:40; 60:40 to 50:50, 50:50 to 40:60, 40:60 to 30:70, or 30:70 to 20:80.

The direct emulsion drilling fluid may further include a viscosifying polymer. The viscosifying polymer may be present in the direct emulsion drilling fluid in any amount suitable for a particular application. For example, the viscosifying polymer may be present in an amount of about 0.2 lb/bbl (pounds per barrel) (0.6 kg/m$^3$) to about 5 lb/bbl (14.3 kg/ms). Alternatively, the viscosifying polymer may be present in the direct emulsion drilling fluid in an amount of about 0.2 lb/bbl (pounds per barrel) (0.6 kg/m$^3$) to about 0.5 lb/bbl (1.4 kg/ms), about 0.5 lb/bbl (1.42 kg/m$^3$) to about 1 lb/bbl (2.9 kg/m$^3$), about 1 lb/bbl (2.9 kg/m$^3$) to about 1.5 lb/bbl (4.3 kg/m$^3$), about 1.5 lb/bbl (4.3 kg/m$^3$) to about 2.5 lb/bbl (7.1 kg/m$^3$), about 2.5 lb/bbl (7.1 kg/m$^3$) to about 4.0 lb/bbl (11.4 kg/m$^3$), or about 4.0 lb/bbl (11.4 kg/m$^3$) to 5.0 lb/bbl (14.3 kg/m$^3$). Additionally, the viscosifying polymer may have any mean particle size range deemed suitable for the specific application. For example, viscosifying polymer may have a mean particle size of about 100 nanometers to about 500 microns. Alternatively, the mean particle size may be about 100 nanometers to about 500 nanometers, about 500 nanometers to about 1 micron, about 1 micron to about 100 microns, about 100 microns to about 250 microns, or about 250 microns to about 500 microns.

The direct emulsion drilling fluid may include a weighting agent such as barite, hematite, calcium, carbonate, siderite, ilmenite, or combinations thereof. The weighting agent may be used to increase the density of the drilling fluid. More specifically, the weighting agent may have a specific gravity suitable for a particular application, such as, without limitation, about 156 lb/ft$^3$ (2.5 g/cm$^3$) to about 343 lb/ft$^3$ (5.5 g/cm$^3$). Alternatively, the specific gravity of the weighting agent may be about 156 lb/ft$^3$ (2.5 g/cm$^3$) to about 219 lb/ft$^3$ (3.5 g/cm$^3$), about 219 lb/ft$^3$ (3.5 g/cm$^3$) to about 281 lb/ft$^3$ (4.5 g/cm$^3$), or about 281 lb/ft$^3$ (4.5 g/cm$^3$) to about 343 lb/ft$^3$ (5.5 g/cm3).

The direct emulsion drilling fluid may further include a clay such as any one of: hectorite, metakaolin, attapulgite, smectites, iolites, sepiolite, or combinations thereof. The clay may be present in the direct emulsion drilling fluid in any amount suitable for a particular application such as, without limitation, in an amount of about 0.5 lb/bbl (1.4 kg/m$^3$) to about 20 lb/bbl (57 kg/m$^3$). Alternatively, the clay may be present in the direct emulsion in an amount of about 0.5 lb/bbl (1.4 kg/m$^3$) to about 3 lb/bbl (9 kg/m$^3$), about 3 lb/bbl (9 kg/m$^3$) to about 8 lb/bbl (23 kg/m$^3$), about 8 lb/bbl (23 kg/m$^3$) to about 15 lb/bbl (43 kg/m$^3$), or about 15 lb/bbl (43 kg/m$^3$) to about 20 lb/bbl (57 kg/m$^3$).

Moreover, the direct emulsion drilling fluid may further include any drilling fluid additives such as, without limitations, pH buffers or control agents, shale inhibitors, corrosion inhibitors, scale inhibitors, degreasers, wetting agents, emulsifiers, filtrate control agents, lost circulation materials, lubricants, rate of penetration enhancers, spotting fluids, sweeping agents, thinners, deflocculants, suspending agents, and combinations thereof. The direct emulsion drilling fluid may include fluid loss additives such as, for example, lignin, lignite, lignin sulfonate, carbon-based fluid loss additives such as asphalt and asphaltenes, and combinations thereof.

The direct emulsion drilling fluids may have a pH suitable for a particular application. Generally, the pH of a direct emulsion drilling fluid may be basic, i.e., pH of greater than 7 at room temperature (about 70° F. (21° C.)). Particularly, the direct emulsion drilling fluid may have a pH of about pH 7 to about pH 13, about pH 7 to about pH 8.5, about pH 8.5 to about pH 9.5, about pH 9.5 to about pH 11, or about pH 11 to about pH 13. The pH of a drilling fluid may be raised by the addition of a hydroxide releasing agent such as caustic soda or a buffer compound.

The direct emulsion drilling fluid may be prepared by any means, such as batch mixing or continuous mixing. For example, all components of the direct emulsion drilling fluid, including aqueous fluid, such as water or brine, oil, poly-quaternary ammonium chloride emulsifier, and additives, may be added to a batch mixer and agitated until the desired amount of mixing is achieved. Alternatively, the direct emulsion drilling fluid may be added to a continuous mixer where components are metered in and a product of direct emulsion drilling fluid is continuously withdrawn. The direct emulsion drilling fluid may be mixed at elevated temperatures to aid in blending of the components and to produce a direct emulsion drilling fluid with desired viscosity, and other fluid properties. For example, the direct emulsion drilling fluid may be prepared at a temperature range of about 150° F. (38° C.) to about 200° F. (93° C.), about 150° F. (38° C.) to about 165° F. (74° C.), about 165° F. (74° C.) to about 175° F. (79° C.), or from 175° F. (79° C.) to about 200° F. (93° C.).

The FIGURE illustrates an exemplary drilling assembly 100 in which a drilling fluid 122, such as a direct emulsion drilling fluid, may be used. It should be noted that while the FIGURE generally depicts a land-based drilling assembly, the principles described herein are equally applicable to subsea drilling operations that employ floating or sea-based platforms and rigs, without departing from the scope of the disclosure.

As illustrated, the drilling assembly 100 may include a drilling platform 102 that may support a derrick 104 having a traveling block 106 for raising and lowering a drill string 108, wherein the drill string 108 may have a proximal end 113 and a distal end 111. The drill string 108 may include, but is not limited to, drill pipe and coiled tubing, as generally known to those skilled in the art. A kelly 110 may support the drill string 108 as it is lowered through a rotary table 112. A drill bit 114 may be attached to the distal end 111 of the drill string 108, wherein the drill bit 114 may be driven either by a downhole motor and/or via rotation of the drill string 108 from the well surface. The drill bit 114 may include, but is not limited to, roller cone bits, PDC bits, natural diamond bits, any hole openers, reamers, coring bits, etc. As the drill bit 114 rotates, it may create a wellbore 116 that may penetrate various subterranean formations 118.

Drilling fluid 122 including an aqueous fluid, wherein the aqueous fluid may be water or brine, oil, poly quaternary ammonium chloride emulsifier, and additives may be prepared. A pump 120, such as a mud pump, may circulate drilling fluid 122 through a feed pipe 124 and to the kelly 110, which conveys the drilling fluid 122 downhole through the interior of the drill string 108 and through one or more orifices in the drill bit 114. The drilling fluid 122 may then be circulated back to the surface via an annulus 126 defined between the drill string 108 and the walls of the wellbore 116. At the surface, the recirculated or spent drilling fluid 122 may exit the annulus 126 and may be conveyed to one or more fluid processing unit(s) 128 via an interconnecting flow line 130. The fluid processing unit(s) 128 may include, but may not limited to, one or more of a shaker, wherein the shaker may be a shale shaker, for example, a centrifuge, a hydrocyclone, a separator (including magnetic and electrical separators), a desilter, a desander, a separator, a filter, wherein the filter may be a diatomaceous earth filter, for example, a heat exchanger, and/or any fluid reclamation equipment. The fluid processing unit(s) 128 may further include one or more sensors, gauges, pumps, compressors, and the like, used store, monitor, regulate, and/or recondition the drilling fluid 122.

After passing through the fluid processing unit(s) 128, a "cleaned" drilling fluid 122 may be deposited into a nearby retention pit 132, wherein the retention pit may be a mud pit, for example. While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure. One or more of the drilling fluid additives may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. Alternatively, the drilling fluid additives may be added to the drilling fluid 122 at any other location in the drilling assembly 100. While the FIGURE shows only a single retention pit 132, there may be more than one retention pit 132, such as multiple retention pits 132 in series. Moreover, the retention pit 132 may be representative of one or more fluid storage facilities and/or units where the drilling fluid additives may be stored, reconditioned, and/or regulated until being added to the drilling fluid 122.

The exemplary drilling fluids disclosed herein may directly or indirectly affect one or more components or pieces of equipment associated with the preparation, delivery, recapture, recycling, reuse, and/or disposal of the disclosed drilling fluids. For example, the disclosed drilling fluids may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary drilling fluids. Moreover, the disclosed drilling fluids may also directly or indirectly affect any transport or delivery equipment used to convey the drilling fluids to a well site or downhole such as, for example, any transport vessels, conduits, pipelines, trucks, tubulars, and/or pipes used to compositionally move the drilling fluids from one location to another, any pumps, compressors, or motors, wherein the motors may be topside or downhole motors, for example, used to drive the drilling fluids into motion, any valves or related joints used to regulate the pressure or flow rate of the drilling fluids, and any sensors, such as pressure sensors or temperature sensors, gauges, and/or combinations thereof, and the like. The disclosed drilling fluids may also directly or indirectly affect the various downhole equipment and tools that may come into contact with the drilling fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats, such as shoes, collars, or valves, for example, logging tools and related telemetry equipment, actuators, such as electromechanical devices, for example, hydromechanical devices, etc.), sliding sleeves, production sleeves, plugs, screens, filters, flow control devices, such as inflow control devices, autonomous inflow control devices, or outflow control devices, for example, couplings, wherein the couplings may include electro-hydraulic wet connect, dry connect, or inductive coupler, for example, control lines, such as electrical lines, fiber optic lines, or hydraulic lines, for example, surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Accordingly, this disclosure describes compositions for direct emulsion drilling fluids and methods of use thereof in subterranean formations. Without limitation, the compositions and methods may further be characterized by one or more of the following statements:

Statement 1. A method of drilling in a subterranean formation comprising: providing a direct emulsion drilling fluid comprising an aqueous-based fluid, an oil, and a polhy-quaternary ammonium chloride emulsifier; circulating the direct emulsion drilling fluid from a surface, through a wellbore, and back to the surface; and extending the wellbore in the subterranean formation while circulating the direct emulsion drilling fluid.

Statement 2. The method of statement 1, wherein the circulating comprises exiting the direct emulsion drilling fluid through an annulus and circulating the direct emulsion drilling fluid to one or more fluid processing units, wherein the fluid processing units comprise at least one fluid processing unit selected from the group consisting of a shaker, a centrifuge, a hydrocyclone, a separator, a heat exchanger, fluid reclamation equipment, and combinations thereof.

Statement 3. The method of statements 1 or 2, further comprising depositing the direct emulsion drilling fluid into a retention pit, wherein the retention pit comprises a mud pit.

Statement 4. The method of any of the preceding statements, wherein the direct emulsion drilling fluid further comprises at least one additive selected from the group consisting of a lubricant, a corrosion inhibitor, a shale inhibitor, a scale inhibitor, a fluid loss additive, an oxygen scavenger, a bridging agent, a pH buffer and combinations thereof.

Statement 5. The method of any of the preceding statements, wherein the aqueous-based fluid comprises a brine composition, wherein the brine composition comprises at least one salt selected from the group consisting of sodium chloride, sodium bromide, potassium bromide, potassium chloride, magnesium chloride, calcium chloride, calcium bromide, potassium formate, cesium formate, lithium chloride, lithium bromide sodium formate, lithium formate, ammonium chloride, tetramethyl ammonium chloride, choline chloride, and mixtures thereof.

Statement 6. The method of any of the preceding statements, wherein the oil comprises at least one oil selected from the group consisting of an α-olefins, internal olefin, alkane, aromatic hydrocarbon, cycloalkane, liquefied petroleum gas, kerosene, diesel oil, crude oil, gas oil, fuel oil, paraffin oil, mineral oil, light cycle oil, tall oil, refined oil, low-toxicity mineral oil, olefin, ester, amide, synthetic oil, polydiorganosiloxane, siloxane, organosiloxane, ether, dialkylcarbonate, vegetable oil, and combinations thereof.

Statement 7. The method of any of the preceding statements, wherein the poly-quaternary ammonium chloride emulsifier comprises at least one group selected from the group consisting of an alkyl group, an aryl group, and combinations thereof, and wherein the alkyl group or aryl group comprise at least one group selected from the group consisting of a methyl, ethyl, propyl, hydroxyethyl, hydroxypropyl, tolyl, xylyl, naphthyl, and combinations thereof.

Statement 8. The method of any of the preceding statements, wherein the direct emulsion drilling fluid comprises about 0.1 lb/bbl to about 15 lb/bbl of the poly-quaternary ammonium chloride emulsifier.

Statement 9. The method of any of the preceding statements, wherein the direct emulsion drilling fluid has a ratio of the oil to the aqueous-based fluid of about 90:10 to about 20:80.

Statement 10. The method of any of the preceding statements, wherein the direct emulsion drilling fluid has a ratio of the oil to the aqueous-based fluid of about 80:20 to about 50:50.

Statement 11. The method of any of the preceding statements, wherein the poly-quaternary ammonium chloride emulsifier is selected from the group consisting of polybenzyldimethylammonium chloride, benzalkonium chloride, benzethonium chloride, methylbenzethonium chloride, cetalkonium chloride, cetylpyridinium chloride, dofanium chloride, didecyldimethylammonium chloride, and combinations thereof.

Statement 12. The method of any of the preceding statements, wherein the poly-quaternary ammonium chloride emulsifier comprises a total molecular weight of less than about 1000.

Statement 13. A direct emulsion drilling fluid comprising: an aqueous-based fluid; a viscosifier; a clay; an oil; a poly-quaternary ammonium chloride emulsifier; and a weighting agent.

Statement 14. The method of statement 13, wherein the aqueous fluid comprises a brine composition, wherein the brine composition comprises at least one salt selected from the group consisting of sodium chloride, sodium bromide, potassium bromide, potassium chloride, magnesium chloride, calcium chloride, calcium bromide, potassium formate, cesium formate, lithium chloride, lithium bromide sodium formate, lithium formate, ammonium chloride, tetramethyl ammonium chloride, choline chloride, and mixtures thereof.

Statement 15. The method of statement 13 or 14, wherein the oil comprises at least one oil selected from the group consisting of an α-olefins, internal olefin, alkane, aromatic hydrocarbon, cycloalkane, liquefied petroleum gas, kerosene, diesel oil, crude oil, gas oil, fuel oil, paraffin oil, mineral oil, light cycle oil, tall oil, refined oil, low-toxicity mineral oil, olefin, ester, amide, synthetic oil, polydiorganosiloxane, siloxane, organosiloxane, ether, dialkylcarbonate, vegetable oil, and combinations thereof.

Statement 16. The method of any one of statements 13 to 15, wherein the a poly-quaternary ammonium chloride emulsifier comprises at least one group selected from the group consisting of an alkyl group, an aryl group, and combination thereof, and wherein the alkyl group or aryl group comprise at least one group selected from the group consisting of a methyl, ethyl, propyl, hydroxyethyl, hydroxypropyl, tolyl, xylyl, naphthyl, and combinations thereof.

Statement 17. The method of any one of statements 13 to 16, wherein the poly-quaternary ammonium chloride emulsifier is selected from the group consisting of polybenzyldimethylammonium chloride, benzalkonium chloride, benzethonium chloride, methylbenzethonium chloride, cetalkonium chloride, cetylpyridinium chloride, dofanium chloride, didecyldimethylammonium chloride, and combinations thereof.

Statement 18. The method of any one of statements 13 to 17, wherein the direct emulsion drilling fluid has a ratio of the oil to the aqueous-based fluid of 90:10 to 20:80.

Statement 19. A direct emulsion drilling fluid comprising: an aqueous-based fluid, wherein the aqueous-based fluid is present in an amount of about 20% by volume to about 90% by volume; a viscosifier, wherein the viscosifier is present in an amount of about 0.2 lb/bbl to about 5 lb/bbl; a clay, wherein the clay is present in an amount of about 0.5 lb/bbl to about 20 lb/bbl; an oil, wherein the oil is present in an amount of about 20% by volume to about 90% by volume; a poly-quaternary ammonium chloride emulsifier, wherein the poly-quaternary ammonium chloride emulsifier is present in an amount of about 0.1 lb/bbl to about 10 lb/bbl; and a weighting agent.

Statement 20. The direct emulsion drilling fluid of statement 19, wherein the poly-quaternary ammonium chloride emulsifier is selected from the group consisting of polybenzyldimethylammonium chloride, benzalkonium chloride, benzethonium chloride, methylbenzethonium chloride, cetalkonium chloride, cetylpyridinium chloride, dofanium chloride, didecyldimethylammonium chloride, and combinations thereof.

EXAMPLES

To facilitate a better understanding of the disclosure, the following examples of certain aspects of some embodiments are given. In no way should the following examples be read to limit, or define, the entire scope of the embodiments.

A direct emulsion drilling fluid was formulated as shown in Table 1 and subjected to various tests. The direct emulsion drilling fluid was prepared at a 60/60:40 oil-to-water ratio. The fluids were mixed using a multimixer and hot roller for 16 hours at 200° F. (93° C.). After hot rolling, the fluids were static aged for 24 hours and thereafter evaluated for stability. The poly quaternary ammonium chloride emulsifier concentration was varied to determine compatibility and stability of the fluids. In this case, concentrations of 0.5, 2.5, and 4.0 lb/bbl (1.43, 7.73, and 11.4 kg/m$^3$) of the poly quaternary ammonium chloride emulsifier were tested. In addition, Mix A, which included the least amount of poly quaternary ammonium chloride emulsifier had the most amount of viscosifier concentration, wherein BARAZAN D PLUS was the viscosifier used. The amount of viscosifier was reduced in the later formulations, Mixes B and C, in order to compensate for the viscosifying effect of the poly quaternary ammonium chloride emulsifier on the fluids.

Table 2 summarizes the results of the experiment, using the formulations shown in Table 1. It was observed that rheology values remained relatively stable after hot rolling and static aging. In addition, good suspension properties were observed even at low dosages of the viscosifier, as seen in the high dial readings, or dial readings greater than 4, for the 6 and 3 rpm rheology values. The plastic viscosity values (PV) were observed to be within acceptable ranges, with PV values less than 30 cP. The electrical stability test (ES) for water wettability was observed to correspond to a stable water-wet system for each fluid, where ES values were less than 10 eV. The fluid also remained basic pH values greater than 8.5, even after hot rolling. It was further observed that there was no phase stratification after hot rolling and static aging; thereby indicating that the poly quaternary ammonium chloride emulsifier formed tight emulsions that were able to withstand the temperatures for the required experimental testing time period.

TABLE 1

|  | MIX-A | MIX-B | MIX-C |
|---|---|---|---|
| O/W |  | 60:40 |  |
| Mud Wt., lb/gal (kg/m$^3$) |  | 8.5 (24.3) |  |
| 10 ppg NaCl brine, lb/bbl (kg/m$^3$) | 184.6 (526.7) | 184.6 (526.7) | 184.6 (526.7) |
| Soda Ash, lb/bbl (kg/m$^3$) (base) | 0.2 (0.6) | 0.2 (0.6) | 0.2 (0.6) |
| BARAZAN D PLUS, lb/bbl (kg/m$^3$) | 0.4 (1.1) | 0.25 (0.7) | 0.25 (0.7) |
| BARABUF, lb/bbl (kg/m$^3$) | 1.25 (3.6) | 1.25 (3.6) | 1.25 (3.6) |
| CARBONOX, lb/bbl (kg/m$^3$) | 2 (5.7) | 2 (5.7) | 2 (5.7) |
| poly quaternary ammonium chloride emulsifier, lb/bbl (kg/m$^3$) | 0.5 (1.4) | 2.5 (7.1) | 4 (11.4) |
| TAU MOD, lb/bbl (kg/m$^3$) | 8 (22.8) | 8 (22.8) | 8 (22.8) |
| Diesel, lb/bbl (kg/m$^3$) | 157.35 (448.9) | 157.35 (448.9) | 157.35 (448.9) |

TABLE 2

|  | MIX-A | MIX-B | MIX-C |
|---|---|---|---|
| Rolled @ 200° F. (93.3 C.), hrs | 16 | 16 | 16 |
| Rheology Temperature, ° F. (C.) | 120 (48.9) | 120 (48.9) | 120 (48.9) |
| 600 rpm | 93 | 42 | 50 |
| 300 rpm | 67 | 30 | 37 |
| 200 rpm | 56 | 25 | 30 |
| 100 rpm | 43 | 19 | 24 |
| 6 rpm | 27 | 9 | 14 |
| 3 rpm | 26 | 8 | 13 |
| Plastic viscosity, cP | 26 | 12 | 13 |
| Yield point, lb/100 sq ft | 41 | 18 | 24 |
| 10-sec gel, lb/100 sq ft | 27 | 11 | 16 |
| 10-min gel, lb/100 sq ft | 63 | 15 | 22 |
| ES | 4 | 3 | 3 |
| Wettability | water wet | water wet | water wet |
| Separation after HR | <3 vol % | <1 vol % | no |
| Separation after Static Aging | no | no | no |
| pH | 9.5 | 9.5 | 9.5 |

The preceding description provides various embodiments of the systems and methods of use disclosed herein which may contain different method steps and alternative combinations of components. It should be understood that, although individual embodiments may be discussed herein, the present disclosure covers all combinations of the disclosed embodiments, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only and may be modified and practiced in different but equivalent manners apparent to those skilled in the art having the benefit of the teachings herein. Although individual embodiments are discussed, the disclosure covers all combinations of all of the embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method of drilling in a subterranean formation comprising:
    providing a direct emulsion drilling fluid comprising an aqueous-based fluid, an oil, and a poly-quaternary ammonium chloride emulsifier;
    circulating the direct emulsion drilling fluid from a surface, through a wellbore, and back to the surface; and
    extending the wellbore in the subterranean formation while circulating the direct emulsion drilling fluid,
    wherein the poly-quaternary ammonium chloride emulsifier is polybenzyldimethylammonium chloride.

2. The method of claim 1, wherein the circulating comprises exiting the direct emulsion drilling fluid through an annulus and circulating the direct emulsion drilling fluid to one or more fluid processing units, wherein the fluid processing units comprise at least one fluid processing unit selected from the group consisting of a shaker, a centrifuge, a hydrocyclone, a separator, a heat exchanger, fluid reclamation equipment, and combinations thereof.

3. The method of claim 2, further comprising depositing the direct emulsion drilling fluid into a retention pit, wherein the retention pit comprises a mud pit.

4. The method of claim 1, wherein the direct emulsion drilling fluid further comprises at least one additive selected from the group consisting of a lubricant, a corrosion inhibitor, a shale inhibitor, a scale inhibitor, a fluid loss additive, an oxygen scavenger, a bridging agent, a pH buffer and combinations thereof.

5. The method of claim 1, wherein the aqueous-based fluid comprises a brine composition, wherein the brine composition comprises at least one salt selected from the group consisting of sodium chloride, sodium bromide, potassium bromide, potassium chloride, magnesium chloride, calcium chloride, calcium bromide, potassium formate, cesium formate, lithium chloride, lithium bromide, sodium formate, lithium formate, ammonium chloride, tetramethyl ammonium chloride, choline chloride, and mixtures thereof.

6. The method of claim 1, wherein the oil comprises at least one oil selected from the group consisting of an α-olefins, internal olefin, alkane, aromatic hydrocarbon, cycloalkane, liquefied petroleum gas, kerosene, diesel oil, crude oil, gas oil, fuel oil, paraffin oil, mineral oil, light cycle oil, tall oil, refined oil, low-toxicity mineral oil, olefin, ester, amide, synthetic oil, polydiorganosiloxane, siloxane, organosiloxane, ether, dialkylcarbonate, vegetable oil, and combinations thereof.

7. The method of claim 1, wherein the poly-quaternary ammonium chloride emulsifier further comprises at least one group selected from the group consisting of an alkyl group, an aryl group, and combinations thereof, and wherein the alkyl group or aryl group comprise at least one group selected from the group consisting of a methyl, ethyl, propyl, hydroxyethyl, hydroxypropyl, tolyl, xylyl, naphthyl, and combinations thereof.

8. The method of claim 1, wherein the direct emulsion drilling fluid comprises about 0.1 lb/bbl to about 15 lb/bbl of the poly-quaternary ammonium chloride emulsifier.

9. The method of claim 1, wherein the direct emulsion drilling fluid has a ratio of the oil to the aqueous-based fluid of about 90:10 to about 20:80.

10. The method of claim 9, wherein the direct emulsion drilling fluid has a ratio of the oil to the aqueous-based fluid of about 80:20 to about 50:50.

11. The method of claim 1, wherein the poly-quaternary ammonium chloride emulsifier comprises a total molecular weight of less than about 1000.

12. The method of claim 1, wherein the direct emulsion drilling fluid further comprises a clay, wherein the clay is present in an amount of about 0.5 lb/bbl to about 20 lb/bbl.

13. A method of drilling in a subterranean formation comprising:
providing a direct emulsion drilling fluid comprising an aqueous-based fluid, a clay, an oil, a poly-quaternary ammonium chloride emulsifier, and a weighting agent;
circulating the direct emulsion drilling fluid from a surface, through a wellbore, and back to the surface; and
extending the wellbore in the subterranean formation while circulating the direct emulsion drilling fluid,
wherein the poly-quaternary ammonium chloride emulsifier is polybenzyldimethylammonium chloride, wherein the aqueous-base fluid comprises sodium chloride, and wherein the oil is diesel oil.

14. The method of claim 13, wherein the oil is present in the direct emulsion drilling fluid at a volume ratio of about 20 vol % to about 90 vol %.

15. The method of claim 13, wherein the poly-quaternary ammonium chloride emulsifier is present in an amount of about 0.10 lb/bbl to about 10 lb/bbl in the emulsion drilling fluid.

16. A method of drilling in a subterranean formation comprising:
providing a direct emulsion drilling fluid comprising:
an aqueous-based fluid;
a viscosifier;
a clay;
an oil;
a poly-quaternary ammonium chloride emulsifier; and
a weighting agent; and
circulating the direct emulsion drilling fluid from a surface, through a wellbore, and back to the surface; and
extending the wellbore in the subterranean formation while circulating the direct emulsion drilling fluid
wherein the poly-quaternary ammonium chloride emulsifier is polybenzyldimethylammonium chloride.

17. The method of claim 16, wherein the circulating comprises exiting the direct emulsion drilling fluid through an annulus and circulating the direct emulsion drilling fluid to one or more fluid processing units, wherein the fluid processing units comprise at least one fluid processing unit selected from the group consisting of a shaker, a centrifuge, a hydrocyclone, a separator, a heat exchanger, fluid reclamation equipment, and combinations thereof.

18. A method of drilling in a subterranean formation comprising:
providing a direct emulsion drilling fluid comprising:
an aqueous-based fluid, wherein the aqueous-based fluid is present in an amount of about 20% by volume to about 90% by volume;
a viscosifier, wherein the viscosifier is present in an amount of about 0.2 lb/bbl to about 5 lb/bbl;
a clay, wherein the clay is present in an amount of about 0.5 lb/bbl to about 20 lb/bbl;
an oil, wherein the oil is present in an amount of about 20% by volume to about 90% by volume;
a poly-quaternary ammonium chloride emulsifier, wherein the poly-quaternary ammonium chloride emulsifier is present in an amount of about 0.1 lb/bbl to about 10 lb/bbl; and
a weighting agent; and
circulating the direct emulsion drilling fluid from a surface, through a wellbore, and back to the surface; and
extending the wellbore in the subterranean formation while circulating the direct emulsion drilling fluid,
wherein the poly-quaternary ammonium chloride emulsifier is polybenzyldimethylammonium chloride.

19. The method of claim 18, wherein the aqueous-base fluid comprises sodium chloride.

20. The method of claim 18, wherein the oil is diesel oil.

* * * * *